(12) United States Patent
Sulc (10) Patent No.: US 9,340,157 B2
(45) Date of Patent: May 17, 2016

(54) AUTOMOTIVE MIRROR ADJUSTMENT SYSTEM

(71) Applicant: Josef M. Sulc, Mercer Island, WA (US)

(72) Inventor: Josef M. Sulc, Mercer Island, WA (US)

( * ) Notice: Subject to any disclaimer, the term of this patent is extended or adjusted under 35 U.S.C. 154(b) by 0 days.

(21) Appl. No.: 14/619,912

(22) Filed: Feb. 11, 2015

(65) Prior Publication Data

US 2015/0224931 A1   Aug. 13, 2015

Related U.S. Application Data

(60) Provisional application No. 61/938,260, filed on Feb. 11, 2014.

(51) Int. Cl.
| | |
|---|---|
| *G02B 7/182* | (2006.01) |
| *G02B 5/08* | (2006.01) |
| *B60R 1/02* | (2006.01) |
| *B60R 1/062* | (2006.01) |
| *B60R 1/12* | (2006.01) |

(52) U.S. Cl.
CPC .................. *B60R 1/025* (2013.01); *B60R 1/062* (2013.01); *B60R 1/1207* (2013.01)

(58) Field of Classification Search
CPC ............ B60R 1/06; B60R 1/12; B60R 1/072; B60R 2001/1253; B60R 1/081; B60R 1/082; B60R 1/007; B60R 2011/0033; B60R 1/006
USPC .................. 359/841, 873, 844, 850, 857, 860
See application file for complete search history.

(56) References Cited

U.S. PATENT DOCUMENTS

| | | | | | |
|---|---|---|---|---|---|
| 4,730,926 | A | * | 3/1988 | Wedemeyer | B60R 1/06 33/264 |
| 5,237,458 | A | * | 8/1993 | Polanyi | B60R 1/06 359/839 |
| 5,500,773 | A | * | 3/1996 | Easter | B60R 1/06 33/264 |

* cited by examiner

*Primary Examiner* — Jade R Chwasz
(74) *Attorney, Agent, or Firm* — Christensen O'Connor Johnson Kindness PLLC (57) ABSTRACT

Systems for optimizing adjustment of automotive side-view mirror assemblies are provided that aid in adjusting the side-view mirrors to reduce blind areas. In general, examples of the systems for optimizing adjustment of automotive side-view mirror assemblies described herein are located on the mirror and the housing. Embodiments of the system generally include a mirror having surface indicia marking a target zone, a housing attached to a vehicle, the housing supporting the mirror; and an alignment guide viewable in the mirror integrated into or attached to the housing. When the alignment guide is visible in the target zone of the mirror, the mirror is optimally adjusted, reducing or eliminating the blind areas normally caused by misadjustment of the side-view mirrors.

20 Claims, 8 Drawing Sheets

AUTOMOTIVE MIRROR ADJUSTMENT SYSTEM

CROSS-REFERENCE TO RELATED APPLICATION

This application claims the benefit of U.S. Provisional Application No. 61/938,260, filed Feb. 11, 2014, the disclosure of which is hereby expressly incorporated by reference herein in its entirety.

BACKGROUND

The optimal adjustment of automobile outside side-view mirrors varies between drivers, ultimately based on the position of the driver's eyes as determined by seating position. As a result, the side-view mirrors are commonly adjustable to cater to this variance in seating position. Improper adjustment can lead to non-optimized alignment of the side-view mirrors. Drivers can create blind areas around their vehicle by misadjusting their side-view mirrors, thereby requiring excessive turning of the head in order to facilitate a safe lane change maneuver. Head turning can cause a distraction, diverting drivers' attention from guiding the vehicle. It also may be increasingly cumbersome for older drivers who may suffer from reduced neck and back flexibility. Increased probability of accidents may result from the inability to reliably check for traffic before initiating a lane change maneuver.

In an effort to reduce accident probability, automakers have developed lane-change assistance technology such as radar or camera blind area traffic detection to alerts drivers when conflicts exist during lane change maneuvers. Such lane-change assistance systems can be costly and complex and may only be an option on higher-end makes and models. In addition, an increasing reliance on lane-change assistance technology can lead to difficulty performing lane change maneuvers without the aid of the systems, e.g., during a system failure, or when adjusting to driving cars with different technology.

Alternative systems exist to counteract the blind areas created by misadjustment of the side-view mirrors, such as the "BlindZoneMirror" that incorporates a smaller secondary mirror within the main mirror area. These small secondary mirrors are typically shaped convex to view an additional area not covered by the main mirror. As a result, the shape and scale of the reflected image is different than the shape and scale of the reflected image in the side-view mirror. Differing reflected image shapes and scales in adjoining mirrors can be confusing and may result in difficulty for a driver to comprehend the surrounding traffic situation with a quick glance at the side-view mirror.

Therefore, there exists a need for an optimizing the existing automotive side-mirror adjustment system on vehicles to ensure a driver can utilize the mirrors to reliably obtain safety-critical information. Embodiments of the present disclosure are directed to fulfilling these and other needs.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment, an automotive side-view mirror assembly is provided. The automotive side-view mirror assembly generally includes a mirror having surface indicia marking a target zone; a housing attached to a vehicle, the housing supporting the mirror; and an alignment guide viewable in the mirror integrated into or attached to the housing. The mirror and the alignment guide may be configured to indicate optimal alignment of the mirror in relation to a seating position of a driver when the alignment guide is reflected within the target zone of the mirror as viewed by the driver.

In accordance with another embodiment, an alignment system configured to attach to an automotive side-view mirror assembly comprising a mirror and a housing connected to a vehicle and supporting the mirror is provided. The alignment system generally includes a target zone marker configured to mark a target zone when attached to a surface of the mirror; and an alignment guide configured to be viewable in the mirror when attached to the housing. The target zone marker and the alignment guide may be configured to indicate optimal alignment of the mirror in relation to a seating position of a driver when the alignment guide is reflected within the target zone of the mirror as viewed by the driver.

In accordance with any of the embodiments described herein, the mirror may have a position in relation to the housing that is adjustable.

In accordance with any of the embodiments described herein, the alignment guide may have a protrusion (e.g., a wedge-like protrusion) in between the housing and the mirror.

In accordance with any of the embodiments described herein, the alignment guide may further include a head portion, and a neck portion smaller in dimension than the head portion, wherein the neck portion is configured to connect the head portion to the housing.

In accordance with any of the embodiments described herein, the alignment guide may be on an outer side of the housing, wherein the outer side is distal to the vehicle when attached.

In accordance with any of the embodiments described herein, the shape of the target zone may match a shape of a portion of the alignment guide reflected in the mirror.

In accordance with any of the embodiments described herein, the target zone may be bound on at least one side by an edge of the mirror.

In accordance with any of the embodiments described herein, the target zone may not contact any edge of the mirror.

In accordance with any of the embodiments described herein, the mirror assembly may further include lighting configured to illuminate the target zone.

In accordance with any of the embodiments described herein, the lighting may be located within the mirror or the housing.

In accordance with any of the embodiments described herein, the surface indicia of the mirror may allow light to shine through the mirror to illuminate the target zone.

In accordance with any of the embodiments described herein, the lighting may be configured to illuminate for a period of time upon activation of a vehicle system (e.g., when the vehicle's engine is started, when the mirror adjustment switch is activated, etc.). In accordance with any of the embodiments described herein, the lighting may include photoluminescent lighting (e.g., fluorescent, phosphorescent, "glow-in-the-dark," etc.).

In accordance with any of the embodiments described herein, the mirror assembly may further include lighting configured to illuminate the alignment guide.

In accordance with any of the embodiments described herein, the lighting may be located within the mirror or housing.

In accordance with any of the embodiments described herein, the lighting may be located within the alignment guide.

In accordance with any of the embodiments described herein, the mirror assembly may be in communication with a lane-change assistance system (e.g., a radar system, a camera system, etc.).

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein are interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Embodiments of the present disclosure are generally directed to systems for optimizing adjustment of automotive side-view mirror assemblies. In general, examples of the systems for optimizing adjustment are capable of use as a stand-alone system or in conjunction with the radar, camera, or other lane change assistance systems. Embodiments of the present disclosure are used to optimize the adjustment of the side-view mirror position regardless of the seating position of the driver. Although embodiments of the present disclosure are not directed to adjustment of the typical interior rear-view mirror, the embodiments work in conjunction with the interior rear-view mirror, and as such, the FIGURES and description herein assume the interior rear-view mirror, if present, is customarily adjusted to be centered on the rear window of the vehicle.

The Society of Automotive Engineers published a paper in 1995 describing the misadjustment of the side-view mirrors and suggested a method for ensuring correct mirror adjustment. Platzer, G., "The Geometry of Automotive Rearview Mirrors—Why Blind Zones Exist and Strategies to Overcome Them," SAE Technical Paper 950601, 1995. An effort to duplicate results using this method of adjustment will not allow precise, repeatable positioning of the side-view mirrors for drivers in any seating position. In addition, the reported method only provides an approximate guide for lateral adjustment about a vertical axis with no alignment guide for tilt adjustment about a horizontal axis. Without optimal tilt adjustment of the side-view mirrors, the headlights of an approaching vehicle may be outside of the reflection, potentially causing a hazard.

In one aspect of the present disclosure, an automotive side-view mirror assembly is provided. In one embodiment, the assembly includes: a mirror having surface indicia marking a target zone; a housing attached to the vehicle, the housing supporting the mirror; and an alignment guide viewable in the mirror integrated into or attached to the housing, wherein the mirror and the alignment guide are configured to indicate optimal alignment of the mirror in relation to a seating position of a driver when the alignment guide is reflected within the target zone of the mirror as viewed by the driver.

Figure 1:
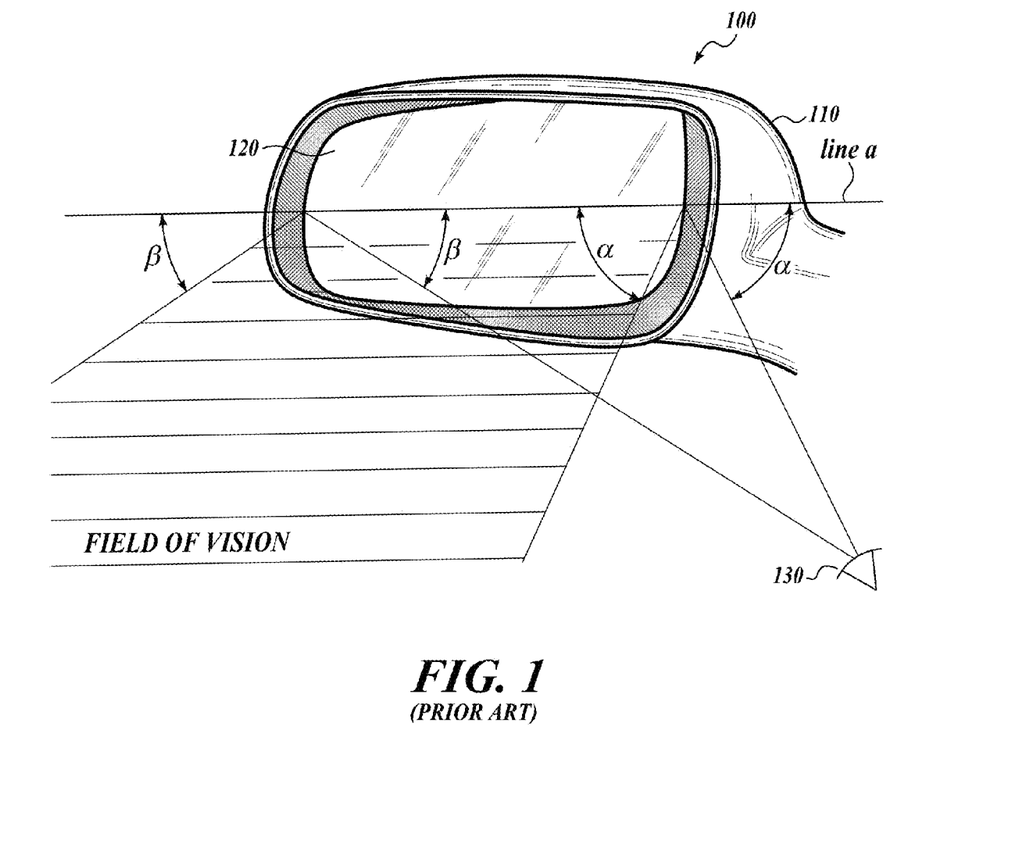
FIG. 1 is a perspective view of a prior art side-view mirror assembly.

Referring to FIG. 1 (Prior Art), a typical automotive side-view mirror assembly 100 is provided. The mirror assembly 100 includes a housing 110 with a power adjustable mirror 120 located within the housing 110. Angles α and β represent the angles between the mirror surface and the driver's sight line from the eye 130, as shown. The sight line reflects from the mirror surface at an intersection represented by the line a, at the same angle as viewed from the eye 130, thus establishing the horizontal mirror field of vision. The setup in FIG. 1 may show a misadjustment of the mirror 120 within the housing 110. Here, the mirror 120 is with lateral adjustment about the vertical axis that is not optimal. As a result, the setup substantially duplicates the visible area covered by the interior rear-view mirror, leaving a blind area.

Orientation language, such as "top," "bottom," "horizontal," "vertical," "interior," "exterior," "side," and "rear" are used in the specification with reference to the orientation of the embodiments of the automotive side-view mirror assemblies as shown in FIGS. 1-12. This language is intended to help the reader and is not intended to be limiting.

Figure 2A:
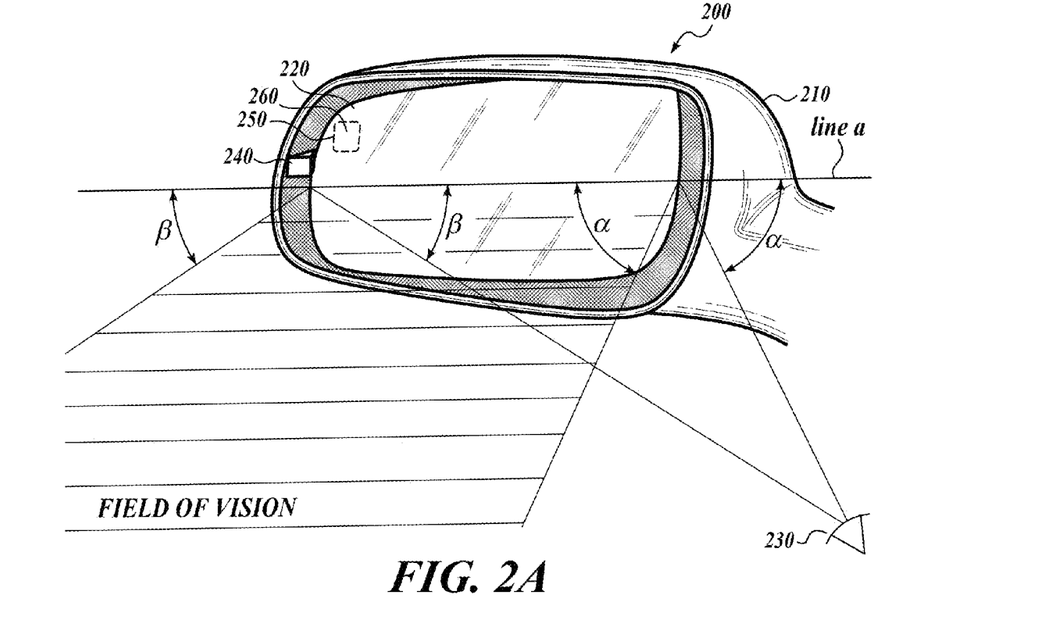
FIG. 2A is a perspective view of an automotive side-view mirror assembly, in accordance with the disclosed embodiments, with the mirror misadjusted, showing no reflection of the alignment guide in the target zone.
Figure 2B:
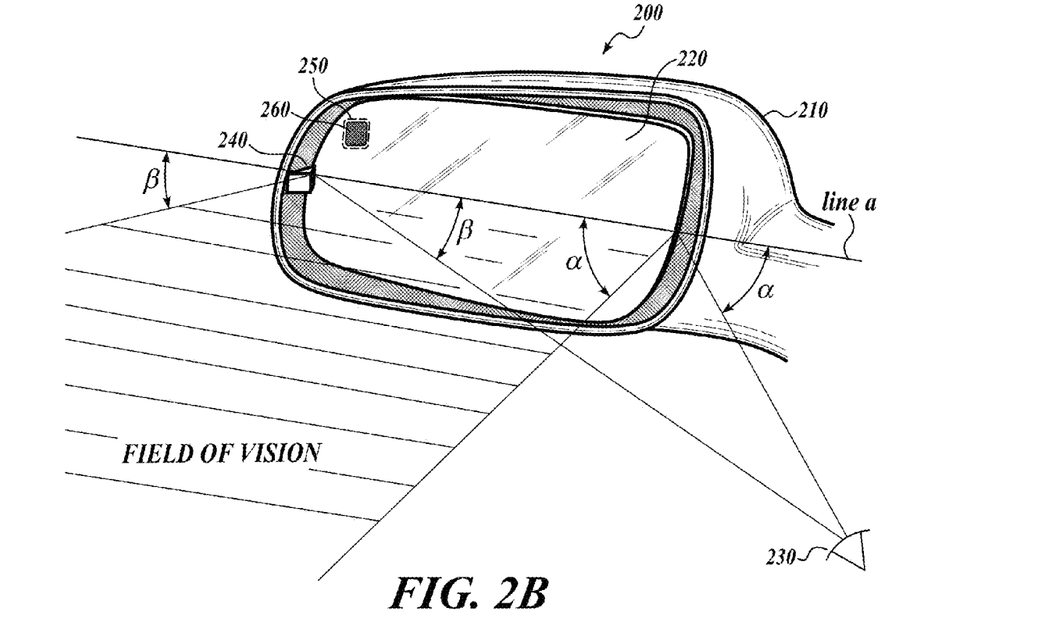
FIG. 2B is a perspective view of the automotive side-view mirror assembly of FIG. 2A, with the mirror optimally adjusted such that the alignment guide is reflected within the target zone.

Referring to FIGS. 2A, 2B, 3A, and 3B, embodiments of the side-view mirror assembly are provided. In FIGS. 2A and 2B, a side-view mirror assembly 200 is shown with a housing 210 and a mirror 220 within the housing 210. In one embodiment, the housing 210 includes an adjustment mechanism (not shown) which allows the mirror 220 to move position with respect to the housing 210.

In the illustrated embodiment in FIGS. 2A and 2B, the housing 210 includes an alignment guide 240. The mirror 220 includes surface indicia 250 configured to facilitate optimum adjustment, in both lateral and tilt directions, of the mirror 220 within the housing 210. A target zone 260 is outlined by the surface indicia 250 on the mirror 220. When the mirror 220 is adjusted to the optimum position, the alignment guide 240 will be reflected within the target zone 260 as in FIG. 2B. When comparing FIGS. 2A and 2B, angles α and β from an eye 230 are reduced in FIG. 2B, resulting in a wider field of vision in a horizontal plane pointing further away from the eye 230 reducing the typical blind area next to a vehicle. Although the alignment guide 240 is shown as a polygonal shape in the illustrated embodiment, in other embodiments, the alignment guide is any shape capable of forming an alignment guide in accordance with the disclosed aspects.

Figure 3A:
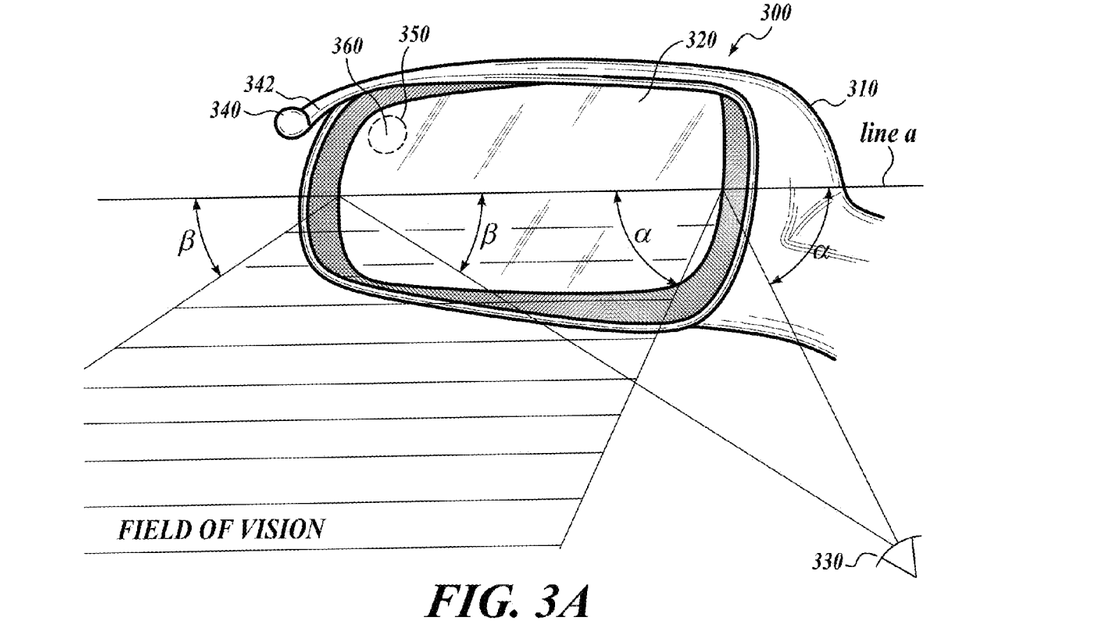
FIG. 3A is a perspective view of an automotive side-view mirror assembly, in accordance with the disclosed embodiments, with the mirror misadjusted, showing no reflection of the alignment guide in the target zone.
Figure 3B:
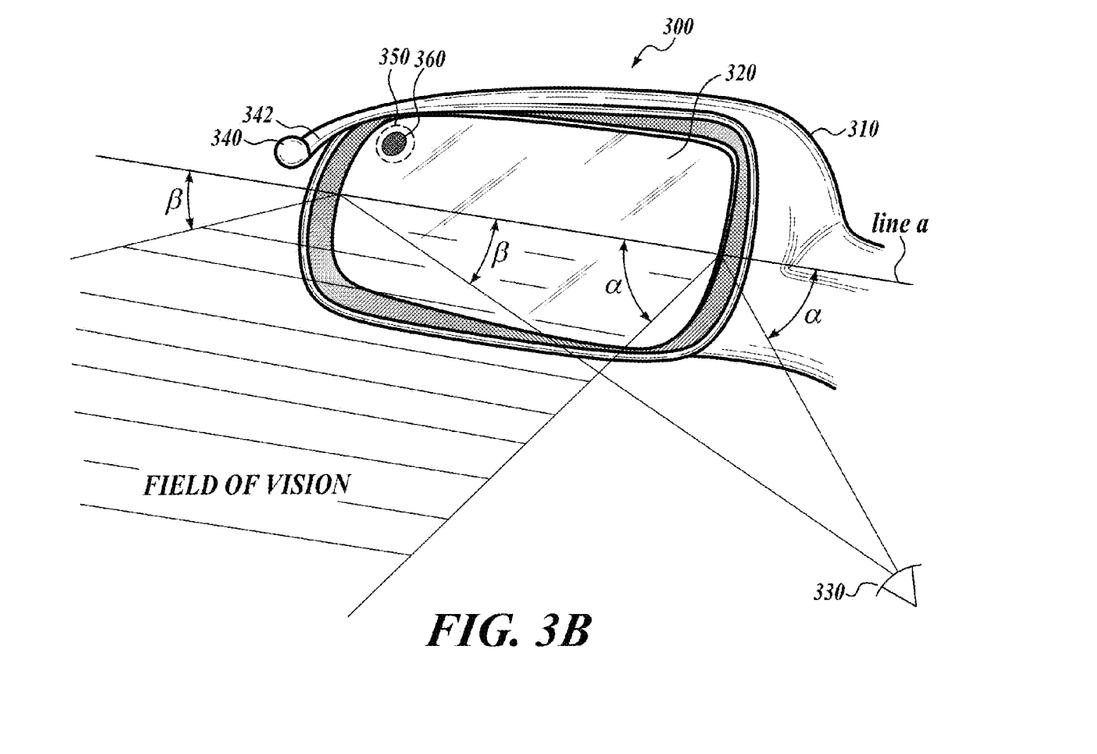
FIG. 3B is a perspective view of the automotive side-view mirror assembly of FIG. 3A, with the mirror adjusted such that the alignment guide is reflected within the target zone.

Referring now to FIGS. 3A and 3B, a side-view mirror assembly 300 is shown with a housing 310 and a mirror 320 within the housing 310. The mirror 320 includes surface indicia 350 and a target zone 360. The side-view mirror assembly 300 is substantially identical in operation as the previously described embodiment except for differences in the alignment guide, as described in greater detail below. The housing 310 includes an alignment guide 340 represented as a spherical head. The spherical head of the alignment guide 340 is attached to the housing 310 by a neck extension 342. In other embodiments, the head of the alignment guide 340 is any shape capable of combining with the alignment guide 340 in accordance with the disclosed aspects.

In some embodiments, addition of the alignment guides 240 and 340, does not affect the shape of the mirror housing. In other embodiments, the mirror housing is altered to optimize the aerodynamics and acoustics (e.g., wind noise) associated with the mirror housing design. In some embodiments, the alignment guide is molded as an integral part of the mirror housing, in which case it shares the material of the mirror housing. In other embodiments, the alignment guide is a separate piece attached to the mirror housing made from any suitable material.

In some embodiments, the alignment guide and/or the target zone are configured for lighting to serve as a reminder to check the alignment of the mirror and to increase visibility of the alignment system in low-light conditions. The lighting is activated by any number of methods, for example: as the driver selects the left or right mirror switch, as the engine is started, as the vehicle lighting is turned on, etc. In some embodiments, the lighting is located within the mirror or housing. In another embodiment, the surface indicia are configured to allow light to shine through the mirror to illuminate the surface indicia and target zone. In another embodiment, the lighting is configured to illuminate for a period of time upon activation of a vehicle system. In another embodiment, the lighting comprises photoluminescent lighting (e.g., fluorescent, phosphorescent, "glow-in-the-dark," etc.). In another embodiment, the lighting is configured to illuminate the alignment guide. In another embodiment, the lighting is internal to the alignment guide.

In some embodiments, certain aspects of the present disclosure are embodied in an aftermarket kit that would provide the surface indicia, target zone, and alignment guide as add-ons to an existing mirror. Accordingly, in this respect, an alignment system configured to attach to an automotive side-view mirror assembly comprising a mirror and a housing connected to a vehicle and supporting the mirror is provided. In one embodiment, the alignment system includes: a target zone marker configured to mark a target zone when attached to a surface of the mirror; and an alignment guide configured to be viewable in the mirror when attached to the housing; wherein the target zone marker and the alignment guide are configured to indicate optimal lateral and tilt alignment of the mirror in relation to a seating position of a driver when the alignment guide is reflected within the target zone of the mirror as viewed by the driver.

Turning now to exemplary FIGS. 4 through FIG. 12, an embodiment of the side-view mirror assembly 200 is shown.

Figure 4:
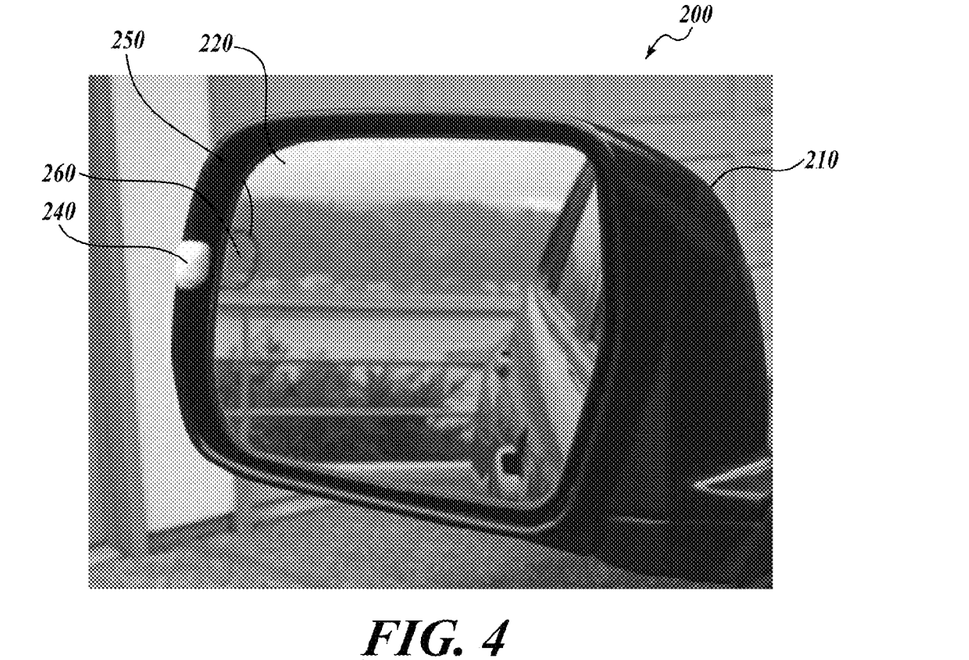
FIG. 4 is a perspective view of an exemplary automotive side-view mirror assembly, in accordance with the disclosed embodiments, with the mirror misadjusted showing no reflection of the alignment guide in the target zone and showing the rear quarter of the primary vehicle.
Figure 7:
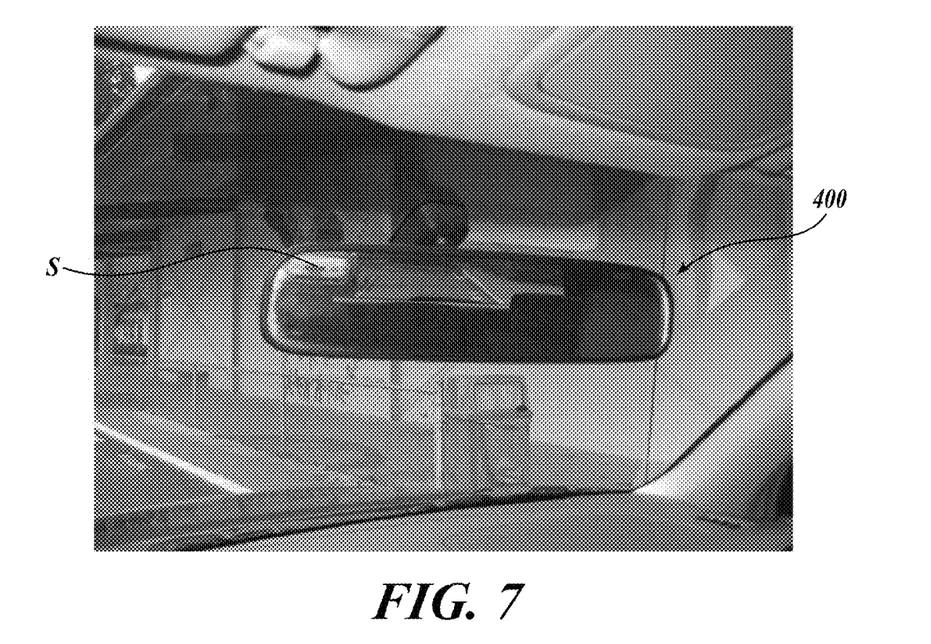
FIG. 7 is a perspective view of an interior rear-view mirror, showing the approaching secondary vehicle in an adjacent lane in the visible reflection.
Figure 8:
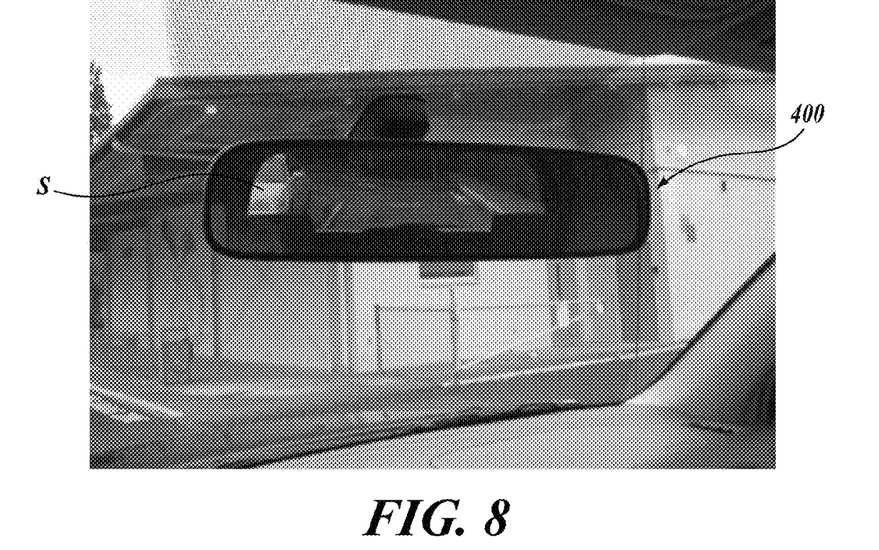
FIG. 8 is a perspective view of an interior rear-view mirror, showing the approaching secondary vehicle in the visible reflection, with the secondary vehicle closer in position to the primary vehicle than shown in FIG. 7.
Figure 9:
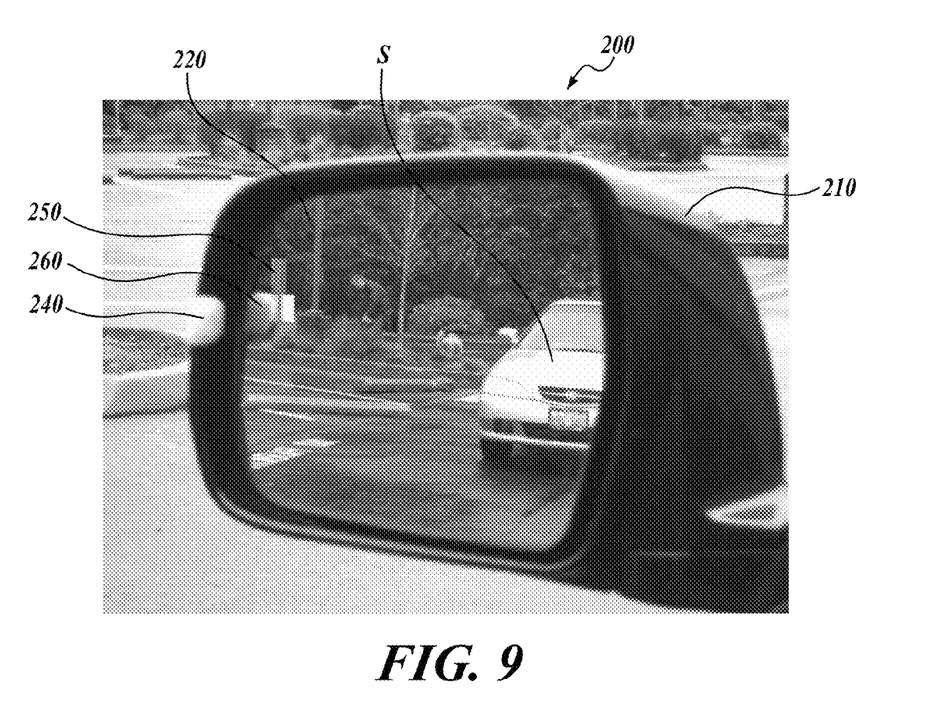
FIG. 9 is a perspective view of the exemplary automotive side-view mirror assembly of FIG. 4, with the mirror adjusted such that the alignment guide is reflected in the target zone, showing the secondary vehicle entering the visible reflection of the side-view mirror, with the secondary vehicle in the same position relative to the primary vehicle as in FIG. 8.

Drivers generally misadjust the outside mirrors to see the rear quarter areas (i.e., area Q in FIG. 12: the area around the rear wheels) of the primary car. In this position, the mirrors 220 are angled too far toward the driver in lateral adjustment about the vertical axis as shown in FIG. 4. Although the general misadjustment of the outside mirrors can be more noticeable in lateral adjustment about the vertical axis, embodiments of the present disclosure additionally optimize tilt adjustment about the horizontal axis. This misadjustment is not optimal for lane change maneuvers as it results in blind areas and substantial duplication of the visible area already covered by an interior rear-view mirror 400. For reference, the visible area generally covered by the interior rear-view mirror 400 is shown in FIGS. 7 and 8.

Figure 5:
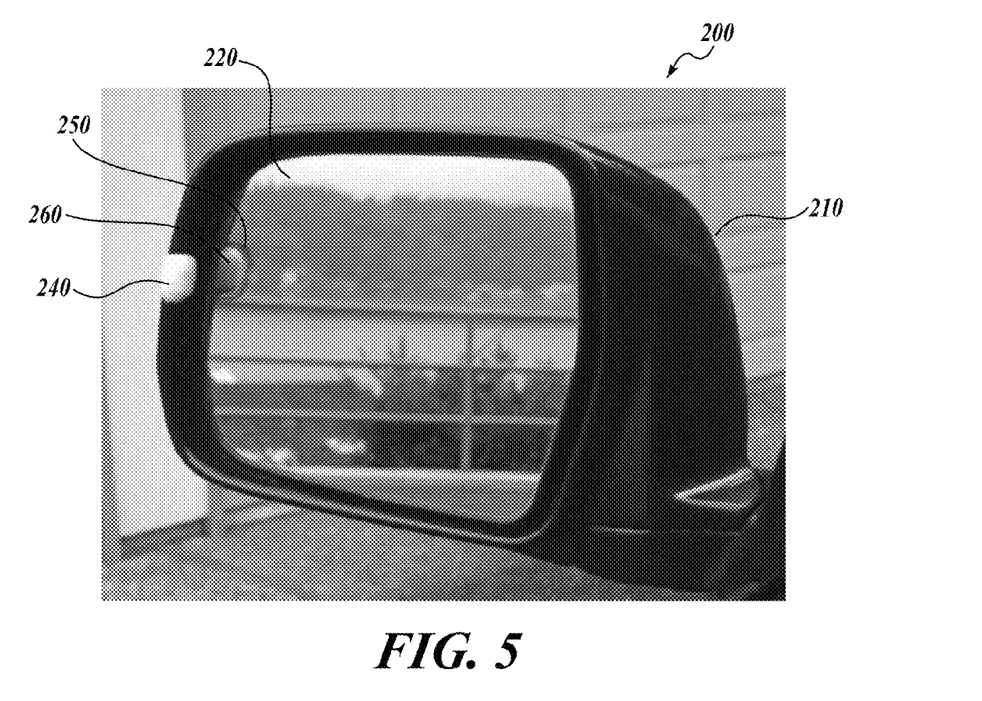
FIG. 5 is a perspective view of the exemplary automotive side-view mirror assembly of FIG. 4, with the mirror adjusted such that the alignment guide is reflected in the target zone and the rear quarter of the primary vehicle is not visible in the mirror.
Figure 6:
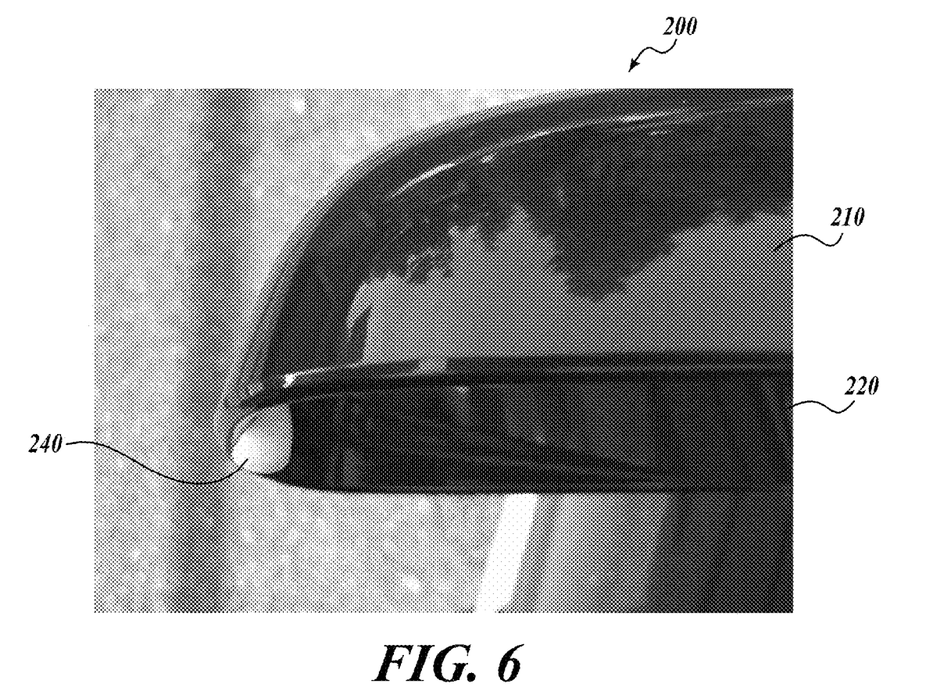
FIG. 6 is a top view of the exemplary automotive side-view mirror assembly of FIG. 4.

However, if the lateral adjustment is optimized, typically resulting in the mirror 220 angled further away from the driver so as to not see the rear quarter areas Q as shown in FIG. 5, less of the visible area covered by the interior rear-view mirror 400 is duplicated, and blind areas around the vehicle are substantially eliminated as shown in the approaching sequence of the secondary vehicle in FIGS. 7-11. Embodiments of the present disclosure aid in adjustment of the outside side-view mirrors 220 to optimize the viewable area and substantially eliminate blind areas. In FIG. 5, the alignment guide 240 is reflected within the target zone 260 of the surface indicia 250 on the mirror 220. As a result, the driver is able to gain a more complete picture of the surrounding traffic without the undesirable duplication of the reflected image and the need for excessive turning of the head beyond what is necessary to view the mirror surface.

In some embodiments, when the side-view mirrors 220 are adjusted using the systems of the present disclosure, a slight visible area overlap with the interior rear-view mirror 400 will be preserved to create a transition of the image from the interior rear-view mirror 400 to the side-view mirror 220. The transition is shown by comparing FIG. 8 and FIG. 9, where the secondary vehicle S in the same position relative to the primary vehicle in both images. In this regard, as a secondary vehicle S approaches the primary vehicle from the rear in an adjacent lane, its reflected image is initially visible in the interior rear-view mirror 400 as shown in FIG. 7, but not yet visible in the side-view mirrors 220. As the secondary vehicle S moves along the side of the primary vehicle, the secondary vehicle S will appear in the outside side-view mirror 220, before the image is lost from the interior rear-view mirror (compare FIGS. 8 and 9). As a result, a transition period exists where the secondary vehicle S is partially visible in both the interior rear-view mirror 400 and the side-view mirror 220.

Figure 10:
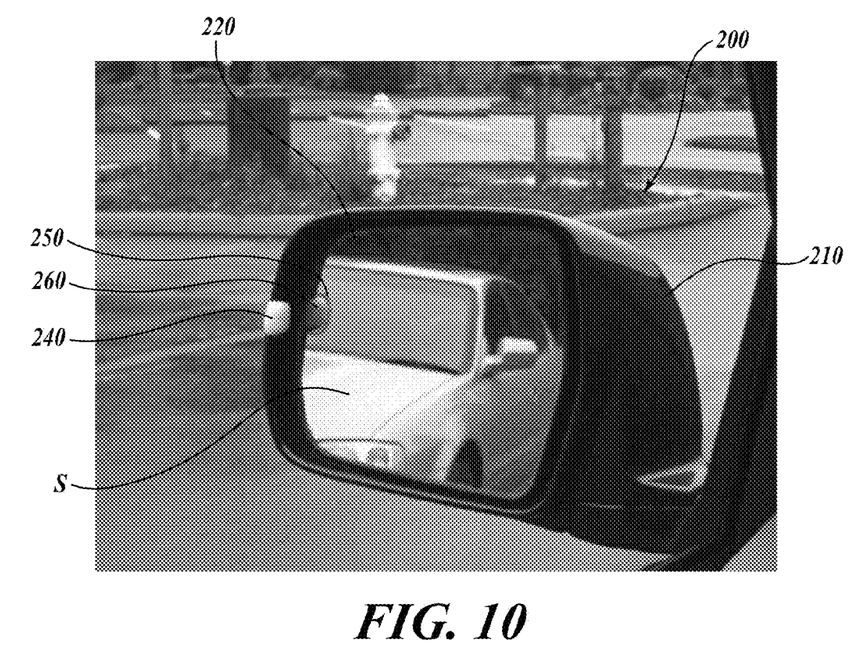
FIG. 10 is a perspective view of the exemplary automotive side-view mirror assembly of FIG. 4, with the mirror adjusted such that the alignment guide is reflected in the target zone, showing the approaching secondary vehicle passing through the visible reflection of the side-view mirror, with the secondary vehicle closer in position to the primary vehicle than shown in FIG. 9.
Figure 11:
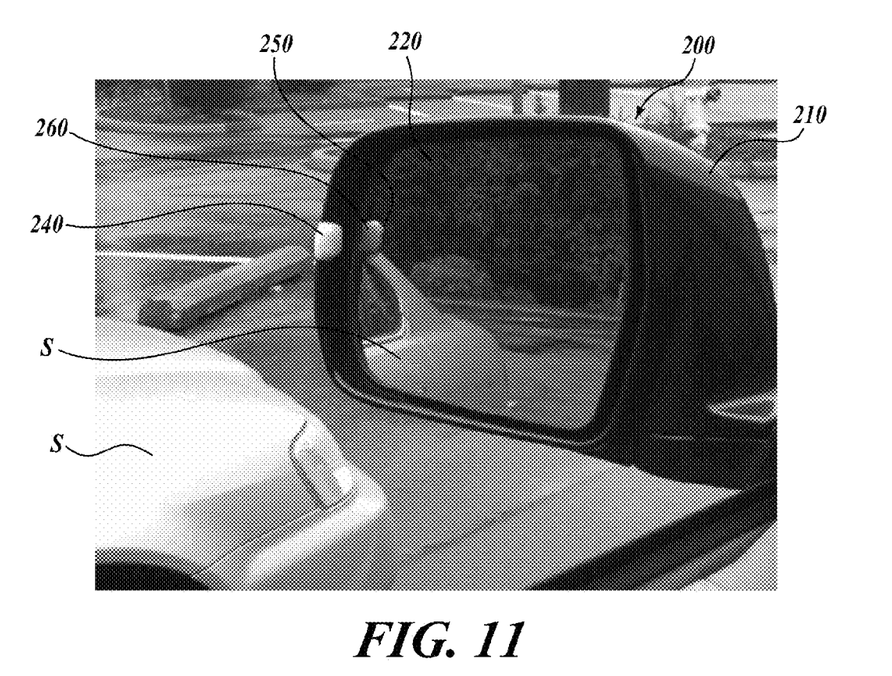
FIG. 11 is a perspective view of the exemplary automotive side-view mirror assembly of FIG. 4, with the mirror adjusted such that the alignment guide is reflected in the target zone, showing the secondary vehicle passing through the visible reflection of the side-view mirror while entering into the peripheral vision of the driver.
Figure 12:
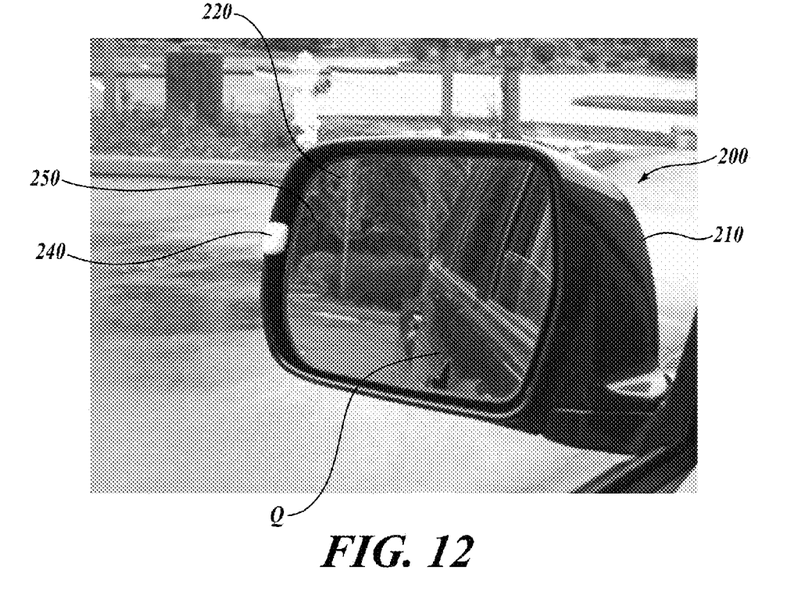
FIG. 12 is a perspective view of the exemplary automotive side-view mirror assembly of FIG. 4 as shown in the view of FIG. 11, with the mirror misadjusted showing no reflection of the alignment guide in the target zone, showing the rear quarter of the primary vehicle, and the secondary vehicle not visible in the side-view mirror.

As the secondary vehicle S advances further in the adjacent lane, it will appear completely in the side-view mirror 220 as shown in FIG. 10 and will no longer appear in the interior rear-view mirror 400. If the mirrors 220 are optimally adjusted, the secondary vehicle S will appear in the driver's direct peripheral vision prior to moving out of the coverage of the side-view mirror 220, as shown in FIG. 11. When the side-view mirrors 220 are misadjusted, the secondary vehicle S has a transition to the direct peripheral vision that is not seamless, resulting in a blind area where the secondary vehicle S is not visible in any mirror or in the driver's peripheral vision, as shown in FIG. 12. In FIGS. 11 and 12, the secondary vehicle S is in the same position, only the mirror 220 has moved. This comparison shows the effect of misadjustment of the mirror 220. In some embodiments, more lanes than the immediate adjacent lane are visible within the viewing area of the side-view mirrors.

In another embodiment of the present disclosure, the mirror assembly is in communication with a lane-change assistance system (e.g., a radar system, a camera system, etc.). When the indicator of such a system was to be located in the mirror housing (e.g., on the inside of the mirror housing wall), it could then also serve as the alignment guide. The indicator would have the desired shape to serve as an alignment guide and be located at the required position inside the mirror housing.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An automotive side-view mirror assembly, comprising:
   (a) a mirror having surface indicia marking a reflective target zone;
   (b) a housing attached to a vehicle, the housing supporting the mirror; and
   (c) an alignment guide viewable in the mirror integrated into or attached to the housing;
   wherein the alignment guide is configured to reflect in the mirror and the reflective target zone of the mirror, and wherein the mirror and the alignment guide are configured to indicate optimal alignment of the mirror in relation to a seating position of a driver when the alignment guide is reflected within the target zone of the mirror as viewed by the driver.

2. The mirror assembly of claim 1, wherein the mirror has a position in relation to the housing that is adjustable.

3. The mirror assembly of claim 1, wherein the alignment guide is a protrusion in between the housing and the mirror.

4. The mirror assembly of claim 1, wherein the alignment guide comprises a head portion, and a neck portion smaller in dimension than the head portion, wherein the neck portion is configured to connect the head portion to the housing.

5. The mirror assembly of claim 1, wherein the alignment guide is on an outer side of the housing, wherein the outer side is distal to the vehicle when attached.

6. The mirror assembly of claim 1, wherein a shape of the target zone matches a shape of a portion of the alignment guide reflected in the mirror.

7. The mirror assembly of claim 1, wherein the target zone is bound on at least one side by an edge of the mirror.

8. The mirror assembly of claim 1, wherein the target zone does not contact any edge of the mirror.

9. The mirror assembly of claim 1, further comprising lighting configured to illuminate the target zone.

10. The mirror assembly of claim 9, wherein the lighting is located within the mirror or housing.

11. The mirror assembly of claim 10, wherein the surface indicia of the mirror allow light to shine through the mirror to illuminate the target zone.

12. The mirror assembly of claim 9, wherein the lighting is configured to illuminate for a period of time upon activation of a vehicle system.

13. The mirror assembly of claim 9, wherein the lighting comprises photoluminescent lighting.

14. The mirror assembly of claim 1, further comprising lighting configured to illuminate the alignment guide.

15. The mirror assembly of claim 14, wherein the lighting is located within the mirror or housing.

16. The mirror assembly of claim 14, wherein the lighting is located within the alignment guide.

17. The mirror assembly of claim 14, wherein the lighting is configured to illuminate for a period of time upon activation of a vehicle system.

18. The mirror assembly of claim 14, wherein the lighting comprises photoluminescent lighting.

19. The mirror assembly of claim 1, wherein the mirror assembly is in communication with a lane-change assistance system.

20. An alignment system configured to attach to an automotive side-view mirror assembly comprising a mirror and a housing connected to a vehicle and supporting the mirror, the alignment system comprising:
   (a) a target zone marker configured to mark a reflective target zone when attached to a surface of the mirror; and
   (b) an alignment guide configured to be viewable in the mirror when attached to the housing;

wherein the alignment guide is configured to reflect in the mirror and the reflective target zone, wherein the target zone marker and the alignment guide are configured to indicate optimal alignment of the mirror in relation to a seating position of a driver when the alignment guide is reflected within the target zone of the mirror as viewed by the driver.

* * * * *